United States Patent
Li et al.

(10) Patent No.: US 12,408,053 B2
(45) Date of Patent: Sep. 2, 2025

(54) BEAM MANAGEMENT ENHANCEMENTS FOR MULTI-TRP SCENARIOS

(71) Applicant: QUALCOMM Incorporated, San Diego, CA (US)

(72) Inventors: Qiaoyu Li, Beijing (CN); Yu Zhang, Beijing (CN); Liangming Wu, Beijing (CN); Chenxi Hao, Beijing (CN); Chao Wei, Beijing (CN); Min Huang, Beijing (CN); Yuwei Ren, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/607,291

(22) PCT Filed: May 28, 2020

(86) PCT No.: PCT/CN2020/092862
§ 371 (c)(1),
(2) Date: Oct. 28, 2021

(87) PCT Pub. No.: WO2020/239010
PCT Pub. Date: Dec. 3, 2020

(65) Prior Publication Data
US 2022/0225138 A1     Jul. 14, 2022

(30) Foreign Application Priority Data

May 31, 2019 (WO) ................ PCT/CN2019/089535

(51) Int. Cl.
*H04W 24/08*     (2009.01)
*H04B 7/08*     (2006.01)
*H04L 5/00*     (2006.01)

(52) U.S. Cl.
CPC ............ *H04W 24/08* (2013.01); *H04B 7/088* (2013.01); *H04L 5/005* (2013.01)

(58) Field of Classification Search
CPC ......... H04W 24/08; H04B 7/088; H04L 5/005
See application file for complete search history.

(56) References Cited

U.S. PATENT DOCUMENTS

2017/0094681 A1    3/2017    Takeda et al.
2018/0042028 A1*   2/2018    Nam ..................... H04L 5/0035
(Continued)

FOREIGN PATENT DOCUMENTS

CN       109644039 A     4/2019
WO    WO-2018028659 A1    2/2018
(Continued)

OTHER PUBLICATIONS

International Search Report and Written Opinion—PCT/CN2020/092862—ISA/EPO—Aug. 26, 2020.
(Continued)

*Primary Examiner* — Kevin M Cunningham
(74) *Attorney, Agent, or Firm* — QUALCOMM Incorporated

(57) ABSTRACT

Apparatus, methods, processing systems, and computer readable mediums for beam management in multi-TRP scenarios are disclosed. An exemplary method generally includes receiving a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group, performing one or more CSI-RS measurements for the one or more transmission hypotheses based, at least in part on the CSI-RS resource
(Continued)

configuration, and determining, for each of the one or more transmission hypotheses, a preferred reception beam for communicating with the at least one BS based, at least in part, on the one or more CSI-RS measurements.

26 Claims, 10 Drawing Sheets

(56) References Cited

U.S. PATENT DOCUMENTS

| | | | |
|---|---|---|---|
| 2018/0091274 A1 | 3/2018 | Islam et al. | |
| 2018/0234931 A1 | 8/2018 | Ly et al. | |
| 2019/0182697 A1 | 6/2019 | Zhang et al. | |
| 2020/0305088 A1* | 9/2020 | Nory | H04B 7/0626 |
| 2020/0373990 A1* | 11/2020 | Da Silva | H04W 16/28 |
| 2022/0376767 A1* | 11/2022 | Nilsson | H04B 7/0862 |

FOREIGN PATENT DOCUMENTS

| | | |
|---|---|---|
| WO | WO-2018063824 | 4/2018 |
| WO | 2018229078 A1 | 12/2018 |
| WO | 2018231124 A1 | 12/2018 |

OTHER PUBLICATIONS

International Search Report and Written Opinion—PCT/CN2019/089535—ISA/EPO—Mar. 2, 2020.

Vivo: "Discussion on Beam Measurement, Beam Reporting and Beam Indication", 3GPP TSG RAN WG1 Meeting #90bis, 3GPP Draft, R1-1717472_Discussion on Beam Measurement, Beam Reporting and Beam Indication, 3rd Generation Partnership Project (3GPP), Mobile Competence Centre, 650, Route Des Lucioles, F-06921 Sophia-Antipolis Cedex, FR, vol. RAN WG1, No. Prague, CZ, Oct. 9, 2017-Oct. 13, 2017, Oct. 8, 2017 (Oct. 8, 2017), 12 Pages, XP051340660, Retrieved from the Internet: URL: http://www.3gpp.org/ftp/Meetings_3GPP_SYNC/RAN1/Docs/ [retrieved on Oct. 8, 2017] sections 1, 2.1.2, 2.2.1, 2.2.2, 2.3.1, 2.3.2. Section 2.2.2, Section 2.2.3, figure 6.

Catt: "Considerations on DL Multi-Panel and Multi-TRP Transmission", 3GPP TSG RAN WG1 Meeting NR#3, R1-1715798, Considerations on DL Multi-Panel and Multi-TRP Transmission, 3rd Generation Partnership Project (3GPP), Mobile Competence Centre, 650, Route Des Lucioles, F-06921 Sophia-Antip, vol. RAN WG1, No. Nagoya, Japan, Sep. 18, 2017-Sep. 21, 2017, Sep. 17, 2017, XP051339258, XP051339258, 4 Pages, Sections 1-6, the whole document.

Ericsson: "CSI Feedback for Multi-TRP", 3GPP TSG-RAN WG1 #91, R1-1720974, CSI Feedback for Multi-TRP, 3rd Generation Partnership Project, Mobile Competence Centre, 650, Route Des Lucioles, F-06921 Sophia-Antipolis Cedex, France, vol. RAN WG1, No. Nov. 27, 2017-Dec. 1, 2017, Nov. 18, 2017, XP051370340, 9 Pages, the whole document.

Supplementary European Search Report—EP20815535—Search Authority—Munich—Jan. 5, 2023.

* cited by examiner

```
TCI-State ::=     SEQUENCE {
    tci-StateId       TCI-StateId,
    qcl-Type1         QCL-Info,
    qcl-Type2         QCL-Info                      OPTIONAL,    -- NEED R
    ...
}, QCL-Info ::=      SEQUENCE {
    cell              ServCellIndex                 OPTIONAL,    -- NEED R
    bwp-Id            BWPId                         OPTIONAL,    -- Cond CSI-RS-Indicated
    referenceSignal   CHOICE {
        csi-rs            NZP-CSI-RS-ResourceId,
        ssb               SSB-Index
    },
    qcl-Type          ENUMERATED {typeA, typeB, typeC, typeD},
    ...
}
```

FIG. 3

BEAM MANAGEMENT ENHANCEMENTS FOR MULTI-TRP SCENARIOS

CROSS REFERENCE TO RELATED APPLICATIONS

This application is a national stage application under 35 U.S.C. 371 of PCT/CN2020/092862, filed May 28, 2020, which claims benefit of International Application No. PCT/CN2019/089535, filed May 31, 2019, which are both assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for beam management.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group; performing one or more CSI-RS measurements for the one or more transmission hypotheses based, at least in part on the CSI-RS resource configuration; determining, for each of the one or more transmission hypotheses, a preferred reception beam for communicating with the at least one BS based, at least in part, on the one or more CSI-RS measurements; determining at least one transmission hypothesis of the one or more transmission hypotheses based at least in part on control signaling received from the at least one BS, wherein the control signaling includes at least one of a quasi-colocation (QCL) information indication or a DMRS-port-group indication for DL transmission; and determining spatial reception parameters for DL reception based, at least in part, on the determined preferred reception beam associated with the determined at least one hypothesis of the one or more transmission hypotheses.

Certain aspects provide an apparatus for wireless communications by a user equipment (UE). The apparatus generally includes at least one processor configured to receive a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group; perform one or more CSI-RS measurements for the one or more transmission hypotheses based, at least in part on the CSI-RS resource configuration; determine, for each of the one or more transmission hypotheses, a preferred reception beam for communicating with the at least one BS based, at least in part, on the one or more CSI-RS measurements; and determine at least one transmission hypothesis of the one or more transmission hypotheses based at least in part on control signaling received from the at least one BS, wherein the control signaling includes at least one of a quasi-colocation (QCL) information indication or a DMRS-port-group indication for DL transmission; and determine spatial reception parameters for DL reception based, at least in part, on the determined preferred reception beam associated with the determined at least one hypothesis of the one or more transmission hypotheses. The apparatus also generally includes a memory coupled with the at least one processor.

Certain aspects provide an apparatus for wireless communications by a user equipment (UE). The apparatus generally includes means for receiving a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group; means for performing one or more CSI-RS measurements for the one or more transmission hypotheses based, at least in part on the CSI-RS resource configuration; means for determining, for each of the one or more transmission hypotheses, a preferred reception beam for communicating with the at least one BS based, at least in part, on the one or more CSI-RS measurements; means for determining at least one transmission hypothesis of the one or more transmission hypotheses based at least in part on control signaling received from the at least one BS, wherein the control signaling includes at least one of a quasi-colocation (QCL) information indication or a DMRS-port-group indication for DL transmission; and means for determining spatial reception parameters for DL reception based, at least in part, on the determined preferred reception beam associated with the determined at least one hypothesis of the one or more transmission hypotheses.

Certain aspects provide a non-transitory computer-readable medium for wireless communications by a user equipment (UE). The non-transitory computer-readable medium generally includes instructions that, when executed by at least one processor, cause the at least one processor to receive a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group; perform one or more CSI-RS measurements for the one or more transmission hypotheses based, at least in part on the CSI-RS resource configuration; determine, for each of the one or more transmission hypotheses, a preferred reception beam for communicating with the at least one BS based, at least in part, on the one or more CSI-RS measurements; and determine at least one transmission hypothesis of the one or more transmission hypotheses based at least in part on control signaling received from the at least one BS, wherein the control signaling includes at least one of a quasi-colocation (QCL) information indication or a DMRS-port-group indication for DL transmission; and determine spatial reception parameters for DL reception based, at least in part, on the determined preferred reception beam associated with the determined at least one hypothesis of the one or more transmission hypotheses.

Certain aspects provide a method for wireless communications by a base station (BS). The method generally includes transmitting, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group; transmitting control signaling to the UE that indicates at least one transmission hypothesis of the one or more transmission hypotheses, wherein the control signaling includes at least one of a quasi-colocation (QCL) information indication associated with spatial reception parameters for DL reception or a DMRS-port-group indication for DL transmission; transmitting one or more CSI-RSs in accordance with the CSI-RS resource configuration; and receiving, from the UE, an indication of a preferred reception beam for one or more of the transmission hypotheses.

Certain aspects provide an apparatus for wireless communications by a base station (BS). The apparatus generally includes at least one processor configured to transmit, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group; transmit control signaling to the UE that indicates at least one transmission hypothesis of the one or more transmission hypotheses, wherein the control signaling includes at least one of a quasi-colocation (QCL) information indication associated with spatial reception parameters for DL reception or a DMRS-port-group indication for DL transmission; transmit one or more CSI-RSs in accordance with the CSI-RS resource configuration; and receive, from the UE, an indication of a preferred reception beam for one or more of the transmission hypotheses. The apparatus also generally includes a memory coupled with the at least one processor.

Certain aspects provide an apparatus for wireless communications by a base station (BS). The apparatus generally includes means for transmitting, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group; means for transmitting control signaling to the UE that indicates at least one transmission hypothesis of the one or more transmission hypotheses, wherein the control signaling includes at least one of a quasi-colocation (QCL) information indication associated with spatial reception parameters for DL reception or a DMRS-port-group indication for DL transmission; means for transmitting one or more CSI-RSs in accordance with the CSI-RS resource configuration; and means for receiving, from the UE, an indication of a preferred reception beam for one or more of the transmission hypotheses.

Certain aspects provide a non-transitory computer-readable medium for wireless communications by a user equipment (UE). The non-transitory computer-readable medium generally includes instructions that, when executed by at least one processor, cause the at least one processor to transmit, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group; transmit control signaling to the UE that indicates at least one transmission hypothesis of the one or more transmission hypotheses, wherein the control signaling includes at least one of a quasi-colocation (QCL) information indication associated with spatial reception parameters for DL reception or a DMRS-port-group indication for DL transmission; transmit one or more CSI-RSs in accordance with the CSI-RS resource configuration; and receive, from the UE, an indication of a preferred reception beam for one or more of the transmission hypotheses.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 illustrates example transmission configuration indication (TCI) state configuration.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
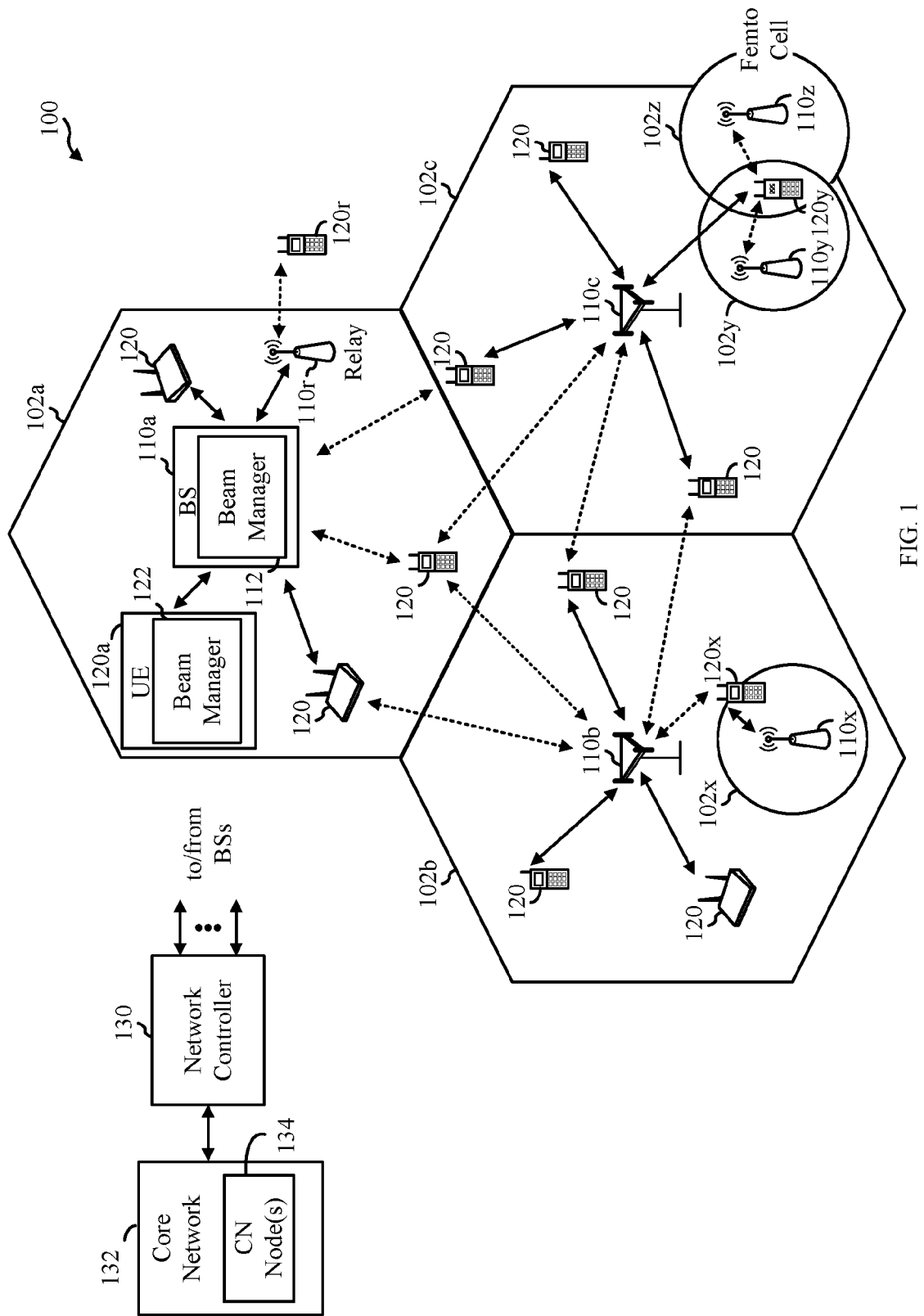
FIG. 1 is a block diagram conceptually illustrating an example telecommunications system, in accordance with certain aspects of the present disclosure.

Aspects of the present disclosure provide apparatus, methods, processing systems, and computer readable mediums for beam management in multi-TRP scenarios. For example, in some cases, a user equipment may receive a channel state information reference signal (CSI-RS) resource configuration from at least one base station (BS) for one or more transmission hypotheses. The UE may perform one or more CSI-RS measurements for the one or more transmission hypotheses based, at least in part on the CSI-RS resource configuration. The UE may then determine, for each of the one or more transmission hypotheses, a preferred reception beam for communicating with the at least one BS based, at least in part, on the one or more CSI-RS measurements. Thereafter the UE may communicate would the at least one BS using the preferred reception beam.

The following description provides examples of beam management in multi-TRP scenarios in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for beam management in multi-TRP scenarios, as described herein. As shown in FIG. 1, the BS 110a includes a beam manager 112. The beam manager 112 may be configured to perform the operations in FIG. 7, as well as other aspects described herein for beam management in multi-TRP scenarios, in accordance with aspects of the present disclosure. Additionally, as shown in FIG. 1, the UE 120a includes a beam manager 122. The beam manager 122 may be configured to perform the operations in FIG. 8, as well as other aspects described herein for beam management in multi-TRP scenarios, in accordance with aspects of the present disclosure.

Figure 2:
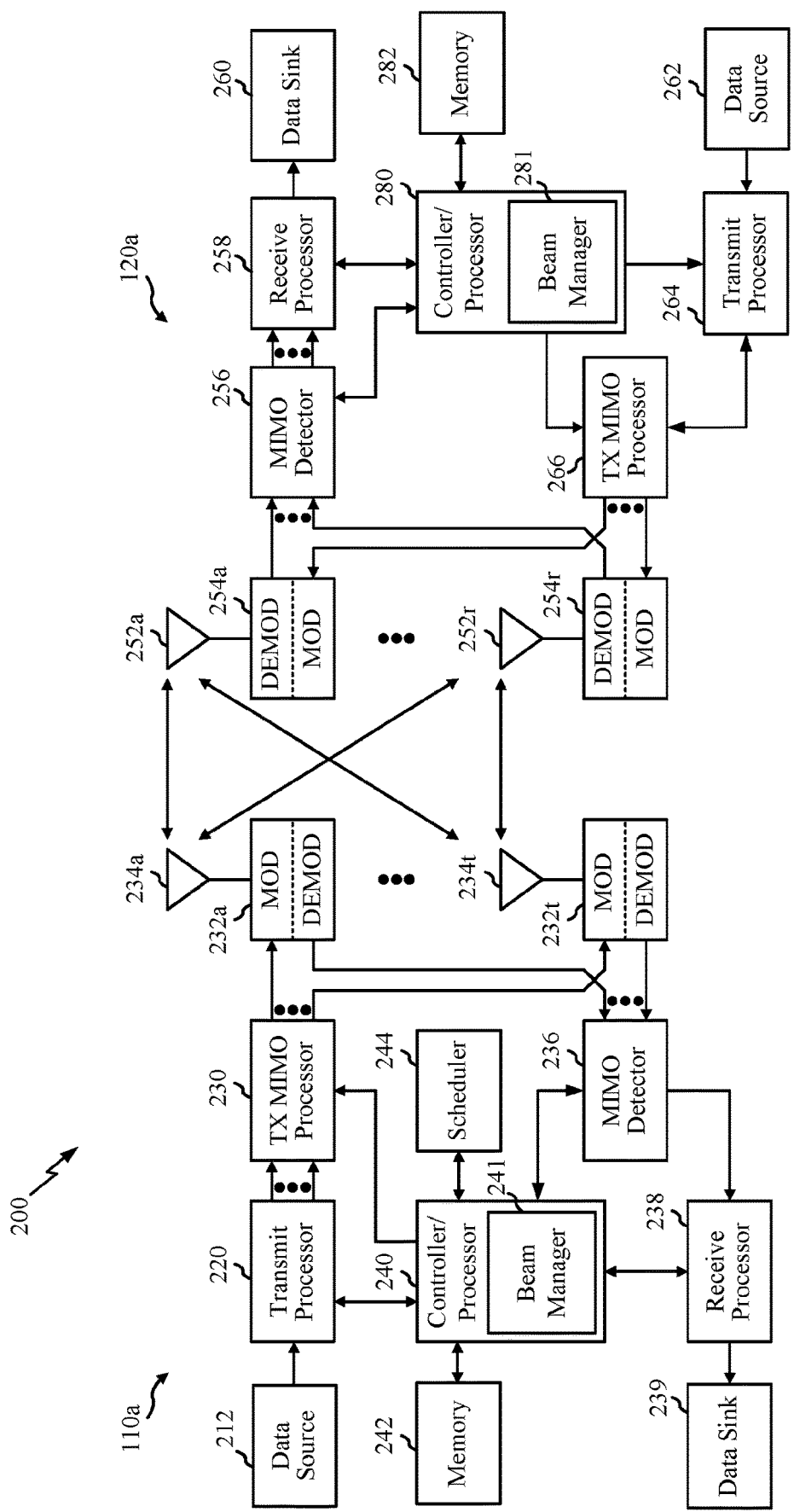
FIG. 2 is a block diagram illustrating an example architecture of a distributed radio access network (RAN), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a includes a beam manager 241 that may be configured to perform the operations in FIG. 7, as well as other aspects described herein for beam management in multi-TRP scenarios. Additionally, as shown in FIG. 2, the controller/processor 280 of the UE 120a includes a beam manager 281 that may be configured to perform the operations in FIG. 8, as well as other aspects described herein for beam management in multi-TRP scenarios. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Example Quasi-Colocation Signaling

Quasi-colocation (QCL) signaling can be used for reference signals (RS) and channels across scenarios involving multiple cells, such as coordinated multipoint (CoMP) scenarios in which multiple transmit receive points (TRPs) integrated access and backhaul (IAB) nodes each have their own cell identification (ID).

QCL assumptions generally refer to assumptions that, for a set of signals or channels considered to be QCL related (or simply "QCL'd" for short), certain characteristics derived for (measured from) one of the signals or channels may be applied to the other. As an example, if PDSCH DMRS is QCL'd with other DL RS, a UE may process PDSCH based on measurements of the other DL RS. In some cases, this may lead to more efficient processing, allowing a UE to use (re-use) previous measurements of the QCL'd RS, which may speed processing of a current channel.

In some cases, QCL assumptions for receptions/transmissions of signals and channels may be signaled via a mechanism referred to as Transmission Configuration Indication (TCI) states, sometimes also referred to as Transmission Configuration Indicator states. In some cases, a UE may be configured with multiple TCI states via radio resource control (RRC) signaling, while one of the TCI states may be indicated by an N bit (e.g., 3-bits) DCI field for PDSCH. A field (e.g., a qcl-info) in an RRC message can list references to TCI States for providing the QCL source and QCL type for associated resources. The TCI states may be indicated by an ID (e.g., a TCI-StateId). An RRC message (e.g., PDSCH-Config field) can contain a field with a list of TCI states indicating a transmission configuration which includes QCL-relationships between the DL RSs in one RS set and the PDSCH DMRS ports. A TCI state associates DL RSs (e.g., one or two) with a corresponding QCL type. A DL BWP and cell, in which the RS is located in may also be indicated.

FIG. 3 illustrates an example of how RSs associated with TCI states may be configured via RRC signaling. The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters, such as average delay and Doppler shift. In some cases, spatial QCL assumptions (e.g., a spatial TX/RX parameter) may be indicated, for example, by Type D. Spatial QCL may mean a (Tx or Rx) beam selected based on a certain signal measurement may be applied to the QCL related signal. If at least spatial QCL is configured/indicated, an RRC field (e.g., a tci-PresentInDCI field) can indicate if TCI field is present or not present in DL-related DCI and when the field is absent the UE considers the TCI to be absent/disabled.

As illustrated in FIG. 3, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

In some examples, the UE can be configured with a list of up to M TCI states by a higher layer parameter to decode PDSCH according to a detected PDCCH with DCI intended for the UE and the given serving cell, where M depends on the UE capability. Each contains parameters for configuring a QCL relationship between one or two downlink RSs and the DM-RS ports of the PDSCH. The QCL relationship is configured by higher layer parameters for the first and second DL RS s, respectively. For the case of two DL RSs, the QCL types may not be the same, regardless of whether the references are to the same DL RS or different DL RSs. The QCL types corresponding to each DL RS are given by another higher layer parameter and may indicate the QCL Type A, QCL Type B, QCL Type C, or QCL type D.

The UE may receive an activation command (e.g., in a MAC-CE) to map one or more of the higher layer configured TCI states (e.g., up to 8 TCI states) to the codepoints of a TCI field in DCI.

For the uplink, a spatial relation parameter may be used. The spatial relation parameter may configure the spatial relation between a reference RS (e.g., SSB, CSI-RS, and/or SRS) and an uplink transmission (e.g., PUCCH, PUSCH, SRS). The can be configured with a set of spatial relations via higher layer signaling (e.g., RRC). A MAC-CE can be used to select a subset (e.g., a single) spatial relation. From the spatial relation, the UE may decide a UE transmit beam to use for uplink transmission.

Example Techniques for Beam Management for Multi-TRP Scenarios

In wireless communications, beam management is important for the performance at higher frequencies since beams may be relatively thin in such scenarios to provide sufficient beamforming gain for the wireless communications.

Figure 4:
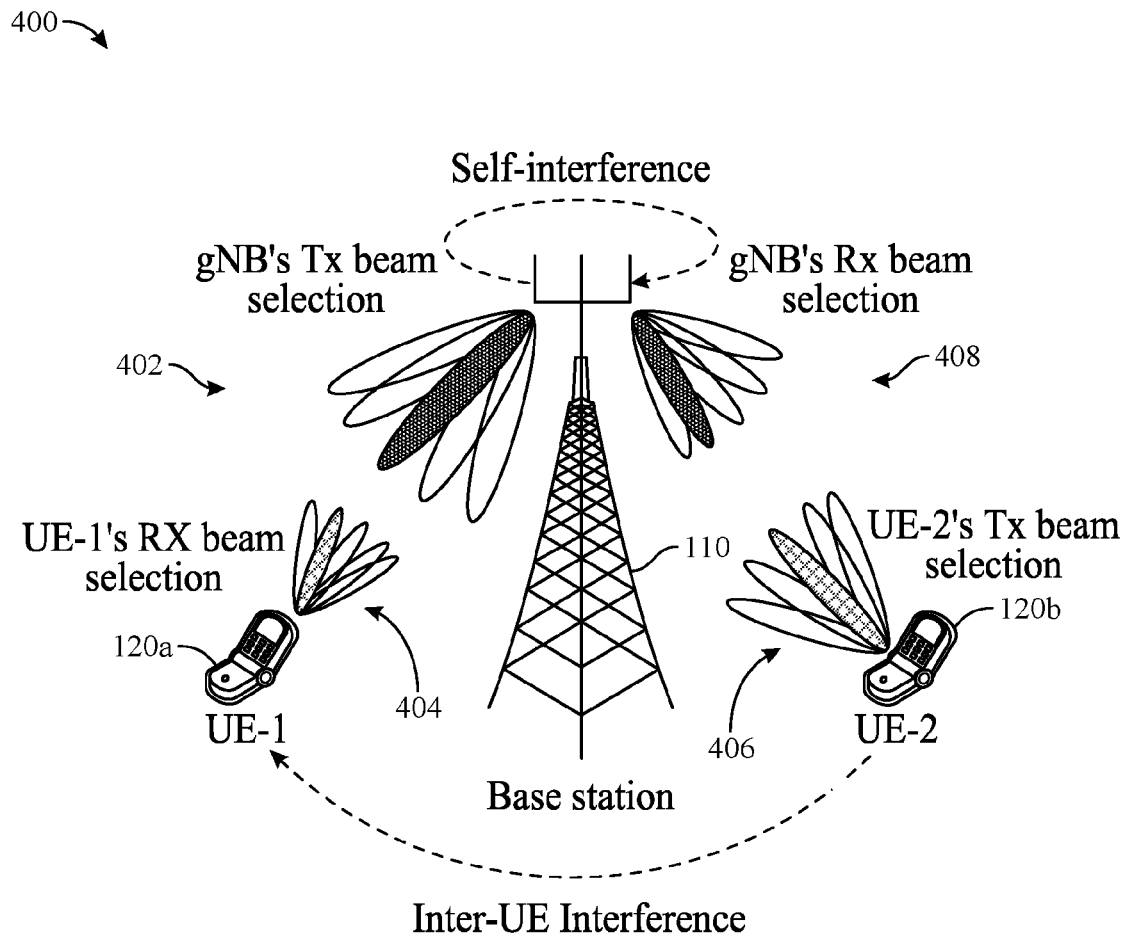
FIG. 4 illustrates an example wireless communication system in which beam management is performed.

FIG. 4 illustrates an example wireless communication system 400 in which beam management may be performed, in accordance with certain aspects of the present disclosure. The wireless communication system 400 may, in some cases, by a 5G NR network or any other suitable network.

As illustrated, beam management may generally controlled by the BS 110. For example, in the downlink (DL), the BS 110 may transmit information using multiple TX beams (e.g., beams 402) to a UE 120a (e.g., UE-1). Thereafter, the UE 120a may report, based on the information transmitted using the multiple TX beams, an index of the TX strongest beams to be used for transmission of signals (e.g., PDSCH).

The UE 120a may also determine one or more reception (Rx) beams (e.g., Rx beams 404) to be used for the reception of signals (e.g., PDSCH) from the BS 110. Generally, the UE may select one or more strongest Rx to receive the signals from the BS 110. Similarly, UE 120b (e.g., UE-2) may determine one or more transmission (Tx) beams (e.g., Tx beams 406) to use for transmission of signals (e.g., PUSCH) to the BS 110, and the BS may select Rx beams (e.g., Rx beams 408) for reception of signals (e.g., PUSCH) from the UE 120b.

In certain aspects, the TX beams of the BS 110 may be used to convey multiple synchronization signal blocks (SSBs) or channel state information-reference signals (CSI-RSs) to the UE 120a. In some cases, each TX beam may be associated with a different SSB and/or different CSI-RS. In some cases, for uplink (UL) transmissions, the UE 120b (e.g., UE-2) may be configured, by the BS 110, to apply different Tx beams to different SRS resources, allowing the BS 110 to select the strongest Tx beam to be used for UL transmissions (e.g., PUSCH). In other cases, the UE 120b may be configured to transmit SRSs with the same TX beam across multiple symbols, allowing the BS to refine its Rx beam 408.

In some cases, the BS 110 may transmit QCL information to the UE 120b, such as Type-D QCL information for PDSCH (e.g., Spatial Rx Parameter), as discussed above. The QCL information may, in some cases, include a CSI-RS resource ID or a SSB-ID for the RS associated with the QCL information, allowing UE to determine an Rx beam for receiving the PDSCH based on a previously measured CSI-RS or SSB.

In certain wireless communication networks (e.g., such as a 5G NR network illustrated in FIG. 1), a user equipment may communicate with the network via multiple transmission reception points (TRPs) (e.g., a first TRP and a second TRP) on one or more transmission beams associated with each of the TRPs. In some cases, each TRP may be associated with a different downlink (DL) demodulation reference signal (DMRS)-port-group. For example, a first TRP may be associated with a first DL DMRS-port-group and a second TRP may be associated with a second DL DMRS-port-group.

Figure 5:
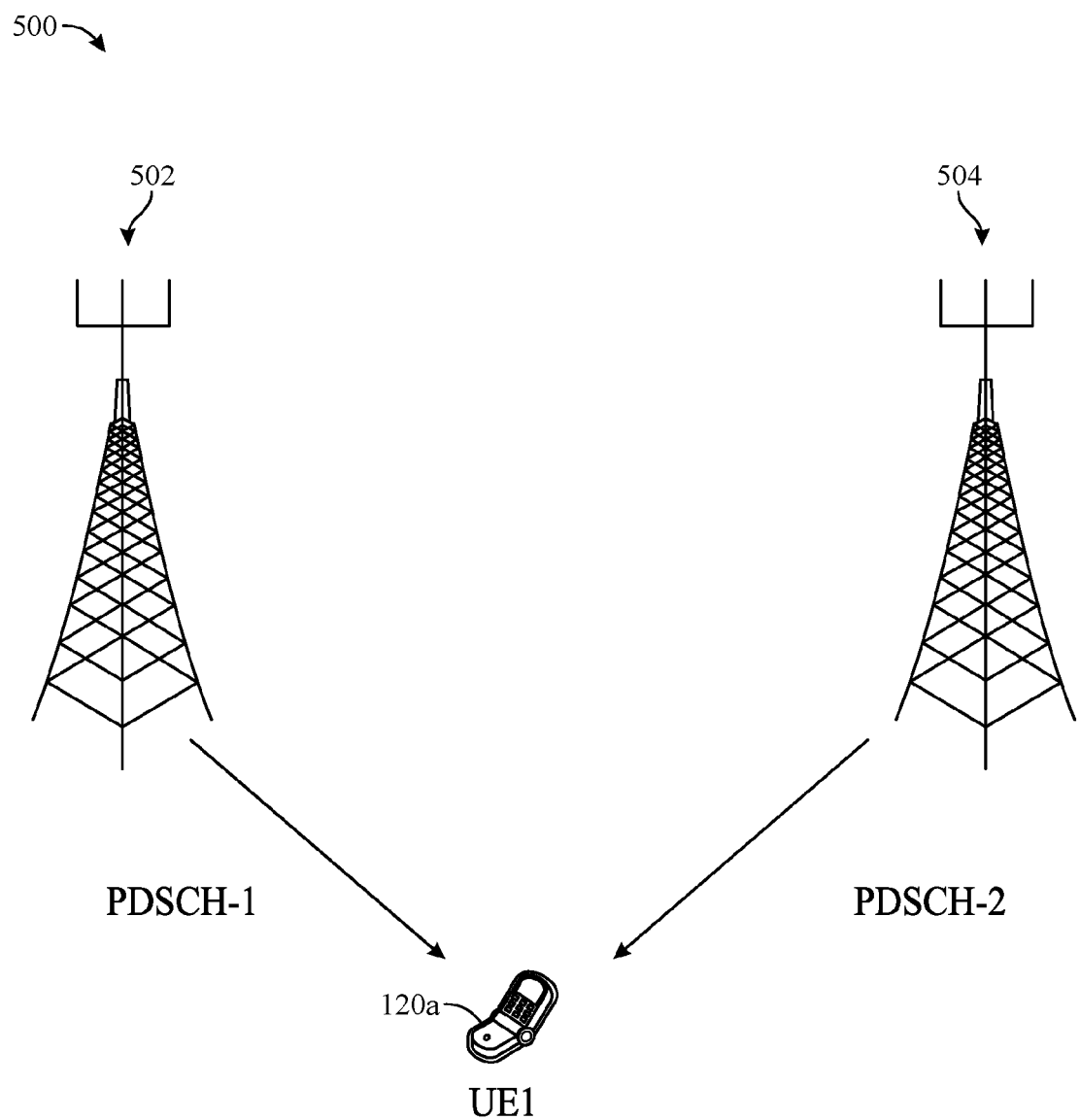
FIG. 5 illustrates an example multi-TRP wireless communication system, in accordance with certain aspects of the present disclosure.

FIG. 5 illustrates an example multi-TRP wireless communication system 500, in accordance with certain aspects of the present disclosure. The multi-TRP wireless communication system 500 may, in some cases, comprise a 5G NR network or any other suitable network. As illustrated, a UE 120a may communicate with a first TRP 502 (e.g., associated with a first DL DMRS-port-group) and a second TRP 504 (e.g., associated with a second DL DMRS-port-group), which may be examples of the base stations 110 illustrated in FIG. 1.

In some cases, each of the TRP 502 and TRP 504 may transmit a physical downlink shared channel (PDSCH) to the UE 120a using the same time-frequency resources (e.g., PDSCH-1 and PDSCH-2). To achieve this, in some cases, the signals from TRP 502 and TRP 504 may use at least one of a same or different redundancy version (RV) of the same layer 1 (L1) code word, different L1 code words, or different layers of the same L1 code word.

In multi-TRP scenarios, different transmission hypotheses exist that the UE may take into account when determining a reception (Rx) beam, as discussed above. For example, depending on the transmission hypothesis, the UE may use a different Rx beam (or a different group of Rx beams) to receive PDSCH(s) from each of the TRPs 502 and 504.

Figure 6:
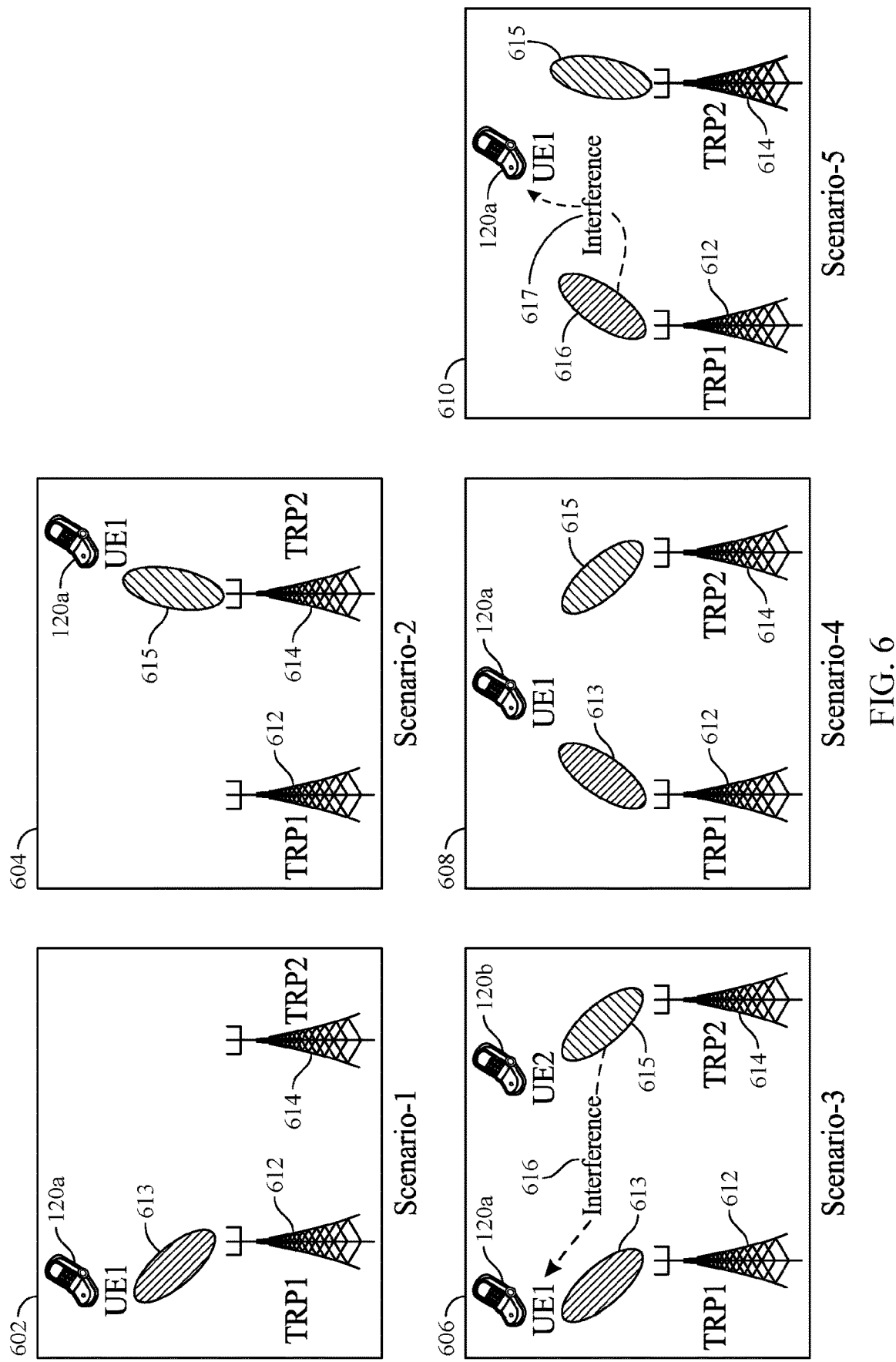
FIG. 6 illustrates different transmission hypotheses in a multi-TRP wireless communication system, in accordance with certain aspects of the present disclosure.

For example, as illustrated in FIG. 6, for a first transmission hypothesis 602, a UE 120a may receive signals 613 from a first TRP 612 (e.g., TRP1) (e.g., associated with a first DL DMRS-port-group) while signals from a second TRP 614 (e.g., TRP2) (e.g., associated with a second DL DMRS-port-group) are refrained/muted (e.g., not transmitted). Further, for a second transmission hypothesis 604, the UE 120a may receive signals 615 from the second TRP 614 while signals from the first TRP 612 are refrained/muted. Additionally, for a third transmission hypothesis 606, the UE 120a may receive signals from the first TRP 612 while receiving interference 616 from signals 615 from the second TRP 614 that is communicating with a second UE 120b. Additionally, for a fourth transmission hypothesis 608, the UE 120a may receive signals 613 from both the first TRP 612 and the second TRP 614 without interference. Further, for a fifth transmission hypothesis 610, the UE 120a may receive signals 615 from the second TRP 614 (associated with the second DL DMRS-port-group) while receiving interfere 617 from signals 613 from the first TRP 612 (associated with the first DL DMRS-port-group).

Currently, only a single CSI-RS resource ID may be indicated in the QCL information. Since one CSI-RS resource may only be associated with one TRP (e.g., because different TRPs may comprise different large-scale channel properties towards the UE), a single CSI-RS resource ID may only allow the UE to determine Rx beam(s) taking into consideration only one TRP. Thus, in multi-TRP scenarios, good Rx beam performance may not be supported for all of the transmission hypotheses shown in FIG. 6 (e.g., especially the transmission hypotheses 3-5) since the UE only obtains a single CSI-RS resource ID associated with only one of the TRPs in the multi-TRP scenario.

Accordingly, aspects of the present disclosure provide techniques to improve Rx beam determination in multi-TRP scenarios. For example, in some cases, improving Rx beam determination in multi-TRP scenarios may involve providing a UE with channel state information reference signal (CSI-RS) resource configuration for one or more transmission hypotheses. In such cases, the CSI-RS resource configuration may include CSI-RS resources corresponding to at least a first downlink (DL) demodulation reference signal (DMRS)-port-group (e.g., associated with a first TRP) and a second DL DMRS-port-group (e.g., associated with a second TRP).

Figure 7:
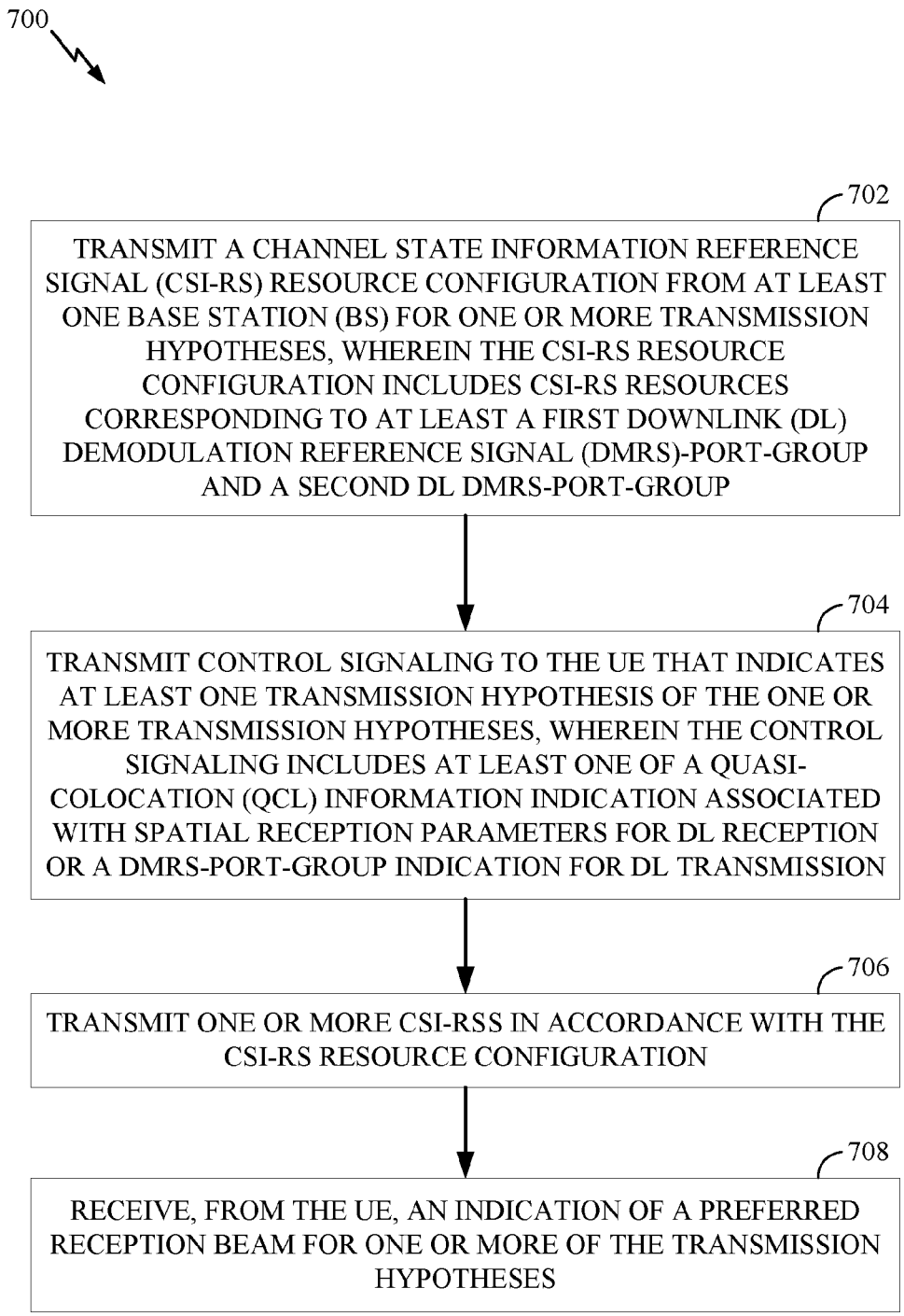
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a first wireless node such as a BS (e.g., such as a BS 110 in the wireless communication network 100). Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 begin, at block 702, by transmitting, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group.

At 704, the BS transmits control signaling to the UE that indicates at least one transmission hypothesis of the one or more transmission hypotheses, wherein the control signaling includes at least one of a quasi-colocation (QCL) information indication associated with spatial reception parameters for DL reception or a DMRS-port-group indication for DL transmission.

At 706, the BS transmits one or more CSI-RSs in accordance with the CSI-RS resource configuration.

At 708, the BS receives, from the UE, an indication of a preferred reception beam for one or more of the transmission hypotheses.

Figure 8:
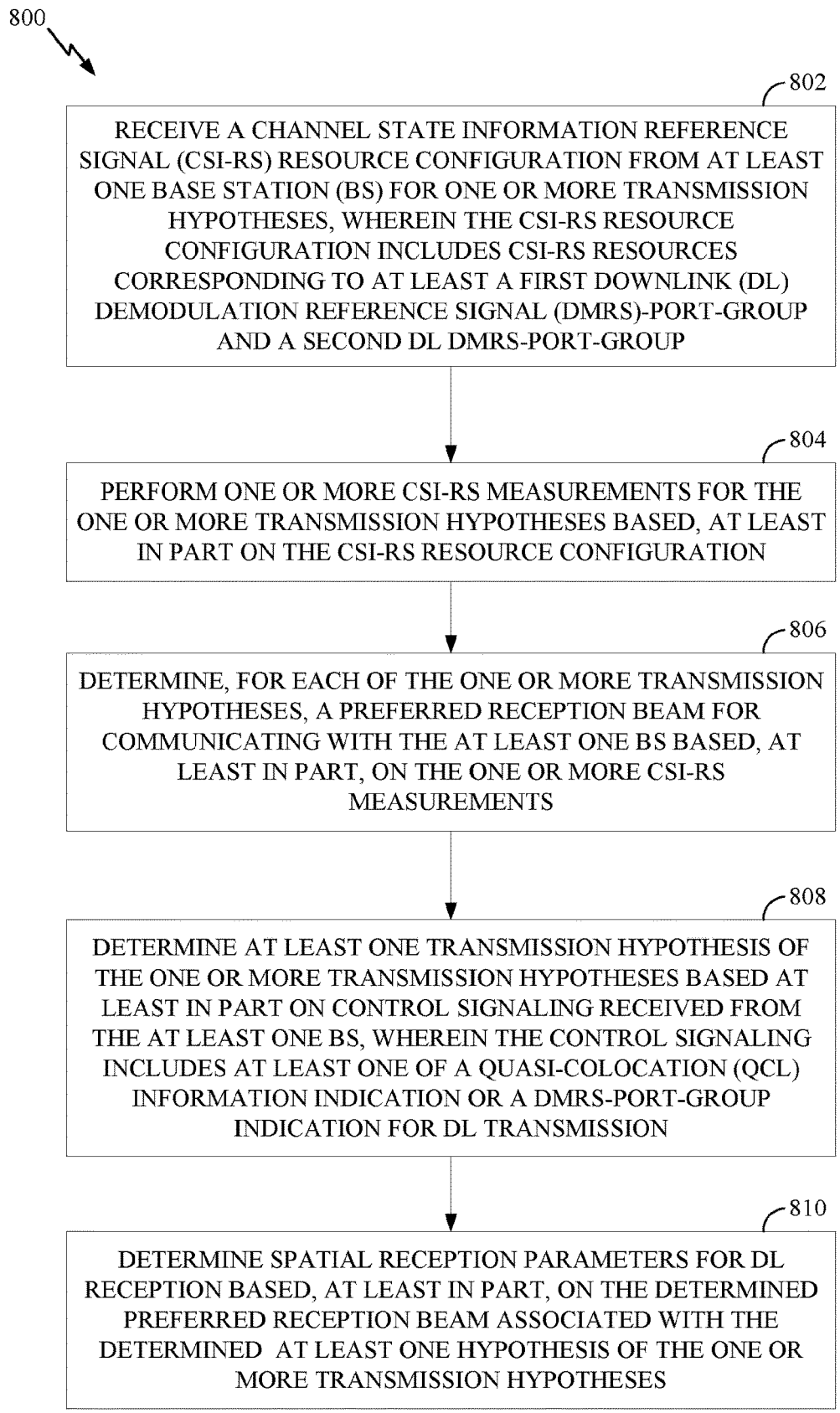
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a first wireless node, such as a UE (e.g., such as a UE 120 in the wireless communication network 100).

The operations 800 may be complimentary operations by the UE to the operations 700 performed by the BS. Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, by the UE receiving a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group.

At 804, the UE performs one or more CSI-RS measurements for the one or more transmission hypotheses based, at least in part on the CSI-RS resource configuration.

At 806, the UE determines, for each of the one or more transmission hypotheses, a preferred reception beam for communicating with the at least one BS based, at least in part, on the one or more CSI-RS measurements.

At 808, the UE determines at least one transmission hypothesis of the one or more transmission hypotheses based at least in part on control signaling received from the at least one BS, wherein the control signaling includes at least one of a quasi-colocation (QCL) information indication or a DMRS-port-group indication for DL transmission.

At 810, the UE determines spatial reception parameters for DL reception based, at least in part, on the determined preferred reception beam associated with the determined at least one hypothesis of the one or more transmission hypotheses.

Additionally, operations 800 may also include the UE transmitting an indication of the preferred reception beam for one or more of the transmission hypotheses to the BS. Additionally, operations 800 may also include communicating with the at least one BS using the preferred receive beam.

As noted above, aspects of the present disclosure provide techniques to improve Rx beam determination in multi-TRP scenarios. For example, in some cases, the UE may be configured by BS/network to monitor a certain CSI-RS resource set, or multiple CSI-RS resources, to measure CSI and determine Rx beam(s) for a particular transmission hypothesis or multiple transmission hypotheses (e.g., transmission hypotheses 1-5, described above), where different CSI-RS resources may be associated different TRPs. For example, since each TRP may be associated with a different DMRS-port-group-ID, each CSI-RS resource may be associated with a different DMRS-port-group-ID.

More specifically, for example, in some cases, the BS may transmit a CSI-RS resource configuration for one or more transmission hypotheses (e.g., as described above). In some cases, the CSI-RS resource configuration may include resources corresponding to at least DL DMRS-port-group (e.g., associated with a first TRP) and a second DL DMRS-port-group (e.g., associated with a second TRP).

In some cases, the CSI-RS resource configuration may comprise a single set of CSI-RS resources. In this case, the single set of CSI-RS resources may comprise a first CSI-RS resource corresponding to the first DL DMRS-port-group and a second CSI-RS resource corresponding to the second DL DMRS-port-group. According to aspects, for each transmission hypothesis configured by the BS, the UE may determine a preferred Rx beam(s), as explained in greater detail below.

Further, for the single CSI-RS resource set, the BS may indicate to the UE what Tx hypotheses to consider when measuring this CSI-RS resource set. In some cases, UE may buffer the received CSI-RSs when performing one or more CSI-RS measurements and run offline measurements regarding different indicated transmission hypothesis to determine a preferred Rx beam. Additionally, as explained in greater detail below, for the single CSI-RS resource set, the BS may also indicate the Tx hypotheses in the QCL information by picking one of the hypothesis measured by the UE, or the UE may identify full/partial hypothesis(es) using the DMRS-port-group configuration and further rely on some other BS indications to finally decide the Tx hypothesis.

In other cases, the CSI-RS resource configuration may comprise a plurality of sets of CSI-RS resources and may indicate that each set of CSI-RS resources in the plurality of sets of CSI-RS resources corresponds with a different transmission hypothesis of the one or more transmission hypotheses. Further, each set of the CSI-RS resources may comprise at least one of a first CSI-RS resource corresponding to the first DL DMRS-port-group and a second CSI-RS resource corresponding to the second DL DMRS-port-group. According to aspects, for each configured CSI-RS resource set/group and associated transmission scenario, the UE may determine a preferred Rx beam(s), as described in greater detail below.

More specifically, for multiple CSI-RS resource sets, each CSI-RS resource set may have one/multiple dedicated transmission hypothesis(es) for the UE to measure, as detailed below. According to aspects, if each CSI-RS resource set includes unique CSI-RS resources compared to another CSI-RS resource set, the UE may measure each resource set for the associated dedicated transmission hypothesis.

Further, the BS may have greater flexibility with the multiple CSI-RS sets to indicate QCL information regarding a certain transmission hypothesis compared to a single CSI-RS resource set. For example, a CSI-RS resource set ID may be used to represent a transmission hypothesis, which may not possible for single CSI-RS resource sets (e.g., since there is only a single CSI-RS resource set). Additionally, in some cases, QCL indication techniques used in the single CSI-RS resource set scenario may also be used in the multiple CSI-RS resource sets scenario.

According to aspects, the multiple sets of CSI-RS resource sets may include a first CSI-RS resource set, CSI-RS resource set/group #1a, that includes CSI-RS resource #1a that may be associated with the first DL DMRS-port-group and transmission hypothesis 602 (e.g., where CSI-RS resource #1a is taken as the signal for CSI-RS measurements).

According to aspects, the multiple sets of CSI-RS resource sets may include a second CSI-RS resource set, CSI-RS resource set/group #1b, that includes CSI-RS resource #1b that may be associated with the second DL DMRS-port-group and transmission hypothesis 604 (e.g., where CSI-RS resource #1b is taken as the signal for CSI-RS measurements).

According to aspects, the multiple sets of CSI-RS resource sets may include a third CSI-RS resource set, CSI-RS resource set/group #2, that includes CSI-RS resource #2a and #2b that may be associated with the first DL DMRS-port-group and the second DL DMRS-port-group, respectively, and transmission hypothesis 608 (e.g., where CSI-RS resource #2a and #2b are both taken as the signal for CSI-RS measurements).

According to aspects, the multiple sets of CSI-RS resource sets may include a fourth CSI-RS resource set, CSI-RS resource set/group #3a, that includes CSI-RS resource #3a1 and #3a2 that may be associated with the first DL DMRS-port-group and the second DL DMRS-port-group, respectively, and transmission hypothesis 606 (e.g., where CSI-RS resource #3a1 is taken as the signal and CSI-RS resource #3a2 in taken as interference for CSI-RS measurements).

According to aspects, the multiple sets of CSI-RS resource sets may include a fifth CSI-RS resource set, CSI-RS resource set/group #3b, that includes CSI-RS resource #3b1 and #3b2 that may be associated with the first DL DMRS-port-group and the second DL DMRS-port-group, respectively, and transmission hypothesis 610 (e.g., where CSI-RS resource #3b2 is taken as the signal and CSI-RS resource #3b1 in taken as interference for CSI-RS measurements).

It should be noted that CSI-RS resources from different CSI-RS resource sets/groups, that are associated with the same DMRS-port-group-ID, may or may not be a same CSI-RS resource. For example, in some cases, CSI-RS resource #1a and CSI-RS resource 2a may be the same CSI-RS resource, as they are both associated with DMRS-port-group #1.

As noted, in response to receiving the CSI-RS resource configuration, the UE may perform one or more CSI-RS measurements for the one or more transmission hypotheses based, at least in part on the CSI-RS resource configuration. According to aspects, for the first transmission hypothesis of the one or more transmission hypotheses (e.g., as described above), performing the one or more CSI-RS measurements may comprise performing a first signal power CSI-RS measurement for a first CSI-RS resource corresponding to the first DL DMRS-port-group and not performing a second CSI-RS measurement for a second CSI-RS resource corresponding to the second DL DMRS-port-group.

According to aspects, for the second transmission hypothesis of the one or more transmission hypotheses, performing the one or more CSI-RS measurements comprises performing a first signal power CSI-RS measurement for a second CSI-RS resource corresponding to the second DL DMRS-port-group and not performing a second CSI-RS measurement for a first CSI-RS resource corresponding to the first DL DMRS-port-group.

According to aspects, for the third transmission hypothesis of the one or more transmission hypotheses, performing the one or more CSI-RS measurements comprises performing a first signal power CSI-RS measurement for a first CSI-RS resource corresponding to the first DL DMRS-port-group and performing a second signal power CSI-RS measurement for a second CSI-RS resource corresponding to the second DL DMRS-port-group.

According to aspects, for the fourth transmission hypothesis of the one or more transmission hypotheses, performing the one or more CSI-RS measurements comprises performing a first signal power CSI-RS measurement for a first CSI-RS resource corresponding to the first DL DMRS-port-group and performing interference measurements for a second CSI-RS resource corresponding to the second DL DMRS-port-group.

According to aspects, for the fifth transmission hypothesis of the one or more transmission hypotheses, performing the one or more CSI-RS measurements comprises performing a first signal power CSI-RS measurement for a second CSI-RS resource corresponding to the second DL DMRS-port-group and performing interference measurements for a first CSI-RS resource corresponding to the first DL DMRS-port-group.

In some cases, once the UE has performed the one or more CSI-RS measurements described above, the UE may determine, for each of the one or more transmission hypotheses, a preferred reception beam for communicating with the at least one BS based, at least in part, on the one or more CSI-RS measurements. For example, according to aspects, for the first transmission hypothesis, the second transmission hypothesis, and the third transmission hypothesis, determining the preferred reception beam may be based on maximizing reception quality associated with the signal power CSI-RS measurements. For example, for the first transmission hypothesis, the second transmission hypothesis, and the third transmission hypothesis, the UE may choose a reception beam that maximizes the reception quality associated with the signal power CSI-RS measurements for each of these transmission hypotheses.

According to aspects, for the fourth transmission hypothesis and the fifth transmission hypothesis, determining the preferred reception beam may be based on maximizing signal-to-interference-plus-noise ratio (SINR) associated with the one or more CSI-RS measurements.

For example, for the fourth transmission hypothesis, the UE may determine a signal power based on the first signal power CSI-RS measurement for the first CSI-RS resource. The UE may also determine an interference power based on the interference measurements for the second CSI-RS resource. Thereafter, the UE may determine a reception beam that maximizes the SINR, which may be based on the signal power and the interference power (e.g., $$SINR = \frac{P}{1+N},$$

where r is me signal power, I is the interference power, and N is noise). In other words, the UE may determine a reception beam that maximizes P and minimizes I.

Similarly, for the fifth transmission hypothesis, the UE may determine a signal power based on the first signal power CSI-RS measurement for the second CSI-RS resource. The UE may also determine an interference power based on the interference measurements for the first CSI-RS resource. The UE may determine a reception beam that maximizes the SINR, which may be based on the signal power and the interference power.

According to aspects, after determining the preferred reception beam for each transmission hypothesis, the UE may transmit an indication of the preferred reception beam to the BS. Thereafter, the UE may use the preferred reception beam, corresponding to a particular transmission hypothesis, when communicating with the BS during that particular transmission hypothesis.

In some cases, in order to perform the one or more CSI-RS measurements, the UE may need to know which transmission hypothesis a CSI-RS resource or resource set is associated with. For example, in some cases, the UE may determine at least one of the transmission hypotheses based at least in part on control signaling received from the at least one BS, including at least one of a QCL information indication or a DMRS-port-group indication for DL transmission.

For example, in some cases, the BS may radio resource control (RRC) configure Type-D QCL information within a certain TCI state, which contains RS for QCL information as a CSI-RS resource set/group ID, or simply a group of multiple CSI-RS resources.

In some cases, for example, when the CSI-RS resource configuration comprises a single set of CSI-RS resources, the QCL information may provide an indication of the one or more transmission hypotheses associated with the CSI-RS resource configuration.

According to aspects, when the CSI-RS resource configuration comprises a plurality of sets of CSI-RS resources and a resource set/group ID associated with a certain transmission hypothesis is used, an additional indication of the transmission hypothesis may not be needed in the QCL information. For example, when the CSI-RS resource configuration comprises a plurality of sets of CSI-RS resources and the QCL information provides an indication of at least one CSI-RS resource set ID identified by the CSI-RS configuration, the QCL information may not provide an explicit indication of the one or more transmission hypotheses associated with the CSI-RS resource configuration.

However, when the CSI-RS resource configuration comprises a plurality of sets of CSI-RS resources and a resource set/group ID associated with a certain transmission scenario is not used, an additional indication of transmission hypothesis may be optional. Thus, for example, in some cases, the QCL information may provide an indication of the one or more transmission hypotheses associated with the CSI-RS resource configuration when a resource set/group ID associated with a certain transmission hypothesis is not used.

However, when the QCL information does not provide an indication of a resource set/group ID associated with a certain transmission hypothesis, the transmission hypothesis associated with the QCL information may be identified based on the DMRS-port-group IDs identified from downlink control information (DCI) that schedules a PDSCH. That is, for example, the UE may determine at least one transmission hypothesis of the one or more transmission hypotheses based on the DMRS-port-group indication for DL transmission in the control signaling received from the BS.

For example, if only DMRS-port-group-#1 is identified from the DCI, transmission hypothesis 602 or transmission hypothesis 606 may be identified by the UE. In some cases, if only DMRS-port-group-#2 is identified from the DCI, transmission hypothesis 604 or transmission hypothesis 610 may be identified by the UE. In some cases, if both DMRS-port-group-#1 and #2 are identified from the DCI, transmission hypothesis 608 may be identified.

According to aspects, if based on DMRS-port-group identification, a certain transmission scenario cannot be identified (i.e., case-1a and 1b), further identification among the partly identified scenarios may be based on additional configuration/indication in the QCL information and/or DCI indication. In other words, when determining the at least one transmission hypothesis of the one or more transmission hypotheses, the UE may not be able to distinguish which transmission hypothesis is correct between at least two transmission hypotheses. Thus, in this case, in addition to determining based on the DMRS-port-group indication, the UE may determine the one or more transmission hypotheses based, at least in part, on the QCL information or other network configuration information.

According to aspects, in some cases, the UE may determine spatial reception parameters for DL reception based at least in part on the preferred reception beam associated with the identified at least one of the transmission hypotheses. The UE may then perform the DL reception based on the spatial reception parameters.

Figure 9:
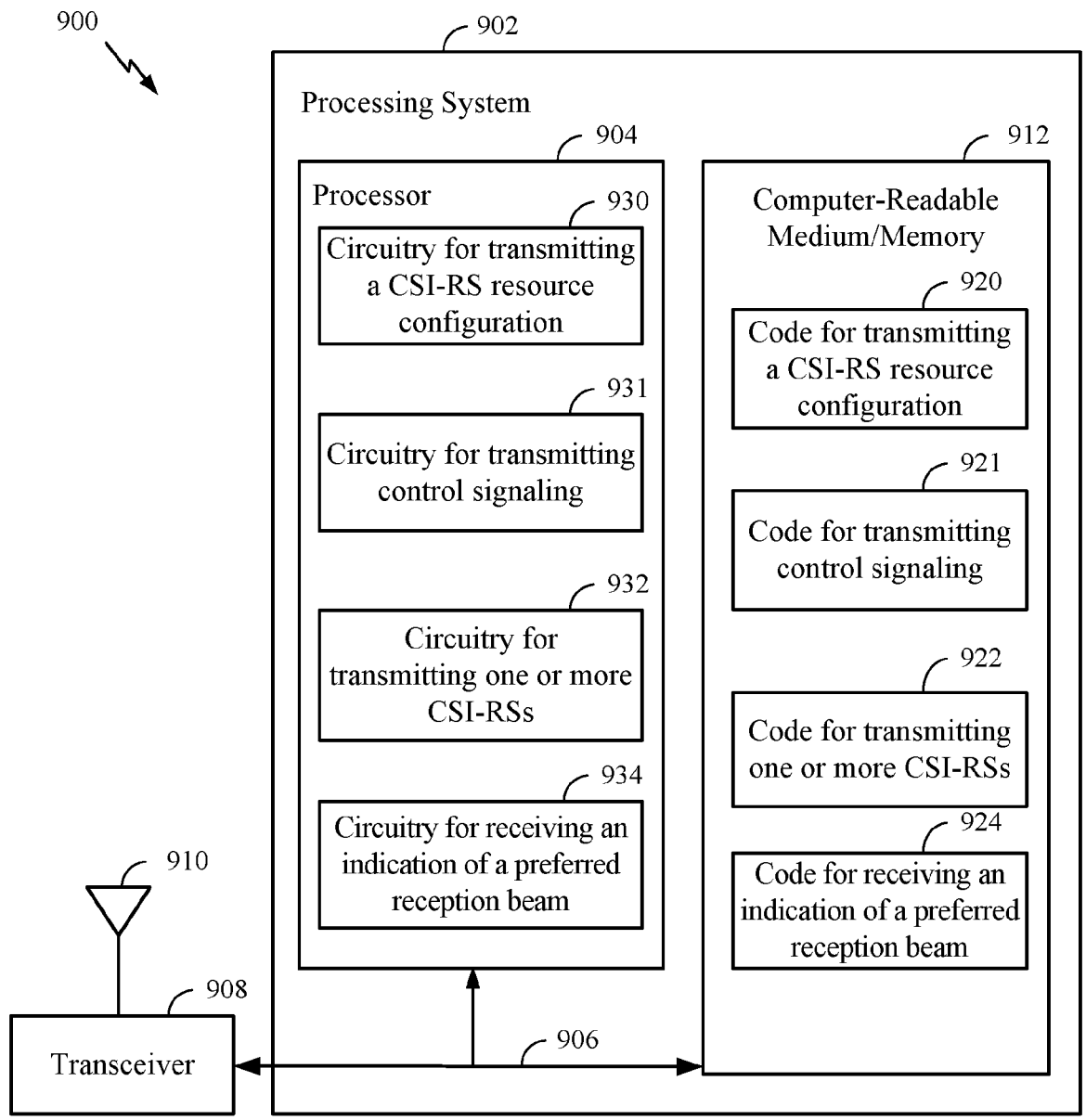
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations described herein. In certain aspects, computer-readable medium/memory 912 stores code for transmitting a CSI-RS resource configuration 920, code for transmitting a control signaling 921, code for transmitting one or more CSI-RSs 922, and code for receiving an indication of a preferred reception beam 924. In certain aspects, the processor 904 has circuitry configured to implement the code stored in the computer-readable medium/memory 912. The processor 904 includes circuitry for transmitting a CSI-RS resource configuration 930, circuitry for transmitting a control signaling 931, circuitry for transmitting one or more CSI-RSs 932, and circuitry for receiving an indication of a preferred reception beam 934.

Figure 10:
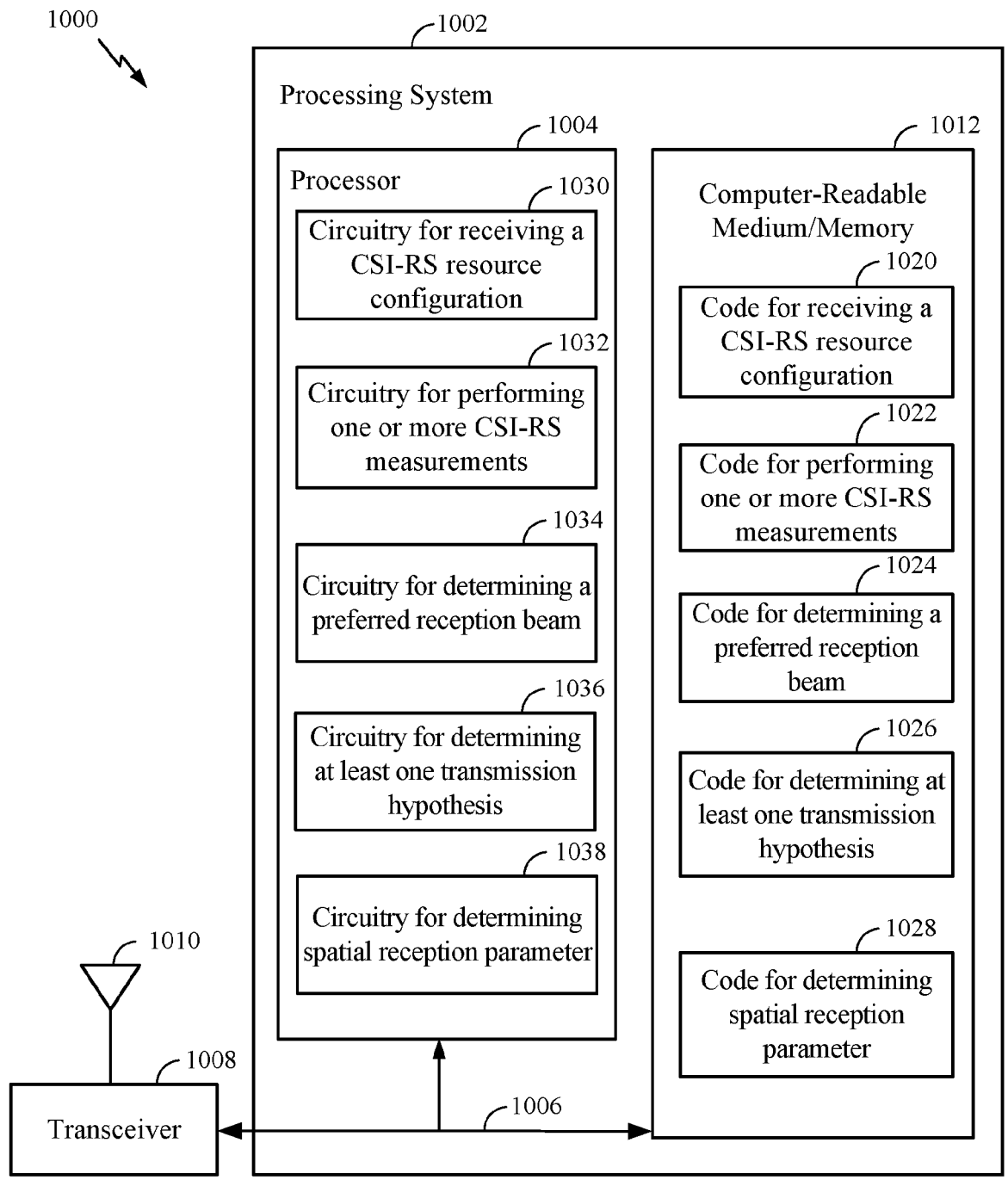
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations described herein. In certain aspects, computer-readable medium/memory 1012 stores code for receiving a CSI-RS resource configuration 1020, code for performing one or more CSI-RS measurements 1022, code for determining a preferred reception beam 1024, code for determining at least one transmission hypothesis 1026, and code for determining spatial reception parameter 1028. In certain aspects, the processor 1004 has circuitry configured to implement the code stored in the computer-readable medium/memory 1012. The processor 1004 includes circuitry for circuitry for receiving a CSI-RS resource configuration 1030, circuitry for performing one or more CSI-RS measurements 1032, circuitry for determining a preferred reception beam 1034, circuitry for determining at least one transmission hypothesis 1036, circuitry for determining spatial reception parameter 1038.

Example Embodiments

Embodiment 1: A method of wireless communication by a user equipment (UE), comprising receiving a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group, performing one or more CSI-RS measurements for the one or more transmission hypotheses based, at least in part on the CSI-RS resource configuration, determining, for each of the one or more transmission hypotheses, a preferred reception beam for communicating with the at least one BS based, at least in part, on the one or more CSI-RS measurements, determining at least one transmission hypothesis of the one or more transmission hypotheses based at least in part on control signaling received from the at least one BS, wherein the control signaling includes at least one of a quasi-colocation (QCL) information indication or a DMRS-port-group indication for DL transmission, and determining spatial reception parameters for DL reception based, at least in part, on the determined preferred reception beam associated with the determined at least one hypothesis of the one or more transmission hypotheses.

Embodiment 2: The method of Embodiment 1, wherein the CSI-RS resource configuration comprises a single set of CSI-RS resources, wherein the single set of CSI-RS resources comprises a first CSI-RS resource corresponding to the first DL DMRS-port-group and a second CSI-RS resource corresponding to the second DL DMRS-port-group.

Embodiment 3: The method of Embodiment 1, wherein: the CSI-RS resource configuration comprises a plurality of sets of CSI-RS resources; the CSI-RS configuration further indicates that each set of CSI-RS resources in the plurality of sets of CSI-RS resources corresponds with a different transmission hypothesis of the one or more transmission hypotheses; and each set of the CSI-RS resources comprises at least one of a first CSI-RS resource corresponding to the first DL DMRS-port-group and a second CSI-RS resource corresponding to the second DL DMRS-port-group.

Embodiment 4: The method of any one of Embodiments 1 through 3, wherein performing one or more CSI-RS measurements for the one or more transmission hypotheses comprises a least one of: for a first transmission hypothesis of the one or more transmission hypotheses, performing the one or more CSI-RS measurements comprises performing a first signal power CSI-RS measurement for a first CSI-RS resource corresponding to the first DL DMRS-port-group and not performing a second CSI-RS measurement for a second CSI-RS resource corresponding to the second DL DMRS-port-group; for a second transmission hypothesis of the one or more transmission hypotheses, performing the one or more CSI-RS measurements comprises performing a first signal power CSI-RS measurement for a second CSI-RS resource corresponding to the second DL DMRS-port-group and not performing a second CSI-RS measurement for a first CSI-RS resource corresponding to the first DL DMRS-port-group; for a third transmission hypothesis of the one or more transmission hypotheses, performing the one or more CSI-RS measurements comprises performing a first signal power CSI-RS measurement for a first CSI-RS resource corresponding to the first DL DMRS-port-group and performing a second signal power CSI-RS measurement for a second CSI-RS resource corresponding to the second DL DMRS-port-group; for a fourth transmission hypothesis of the one or more transmission hypotheses, performing the one or more CSI-RS measurements comprises performing a first signal power CSI-RS measurement for a first CSI-RS resource corresponding to the first DL DMRS-port-group and performing interference measurements for a second CSI-RS resource corresponding to the second DL DMRS-port-group; or for a fifth transmission hypothesis of the one or more transmission hypotheses, performing the one or more CSI-RS measurements comprises performing a first signal power CSI-RS measurement for a second CSI-RS resource corresponding to the second DL DMRS-port-group and performing interference measurements for a first CSI-RS resource corresponding to the first DL DMRS-port-group.

Embodiment 5: The method of Embodiment 4, wherein for the first transmission hypothesis, the second transmission hypothesis, and the third transmission hypothesis, determining the preferred reception beam is based on maximizing reception quality associated with the signal power CSI-RS measurements.

Embodiment 6: The method of Embodiments 4 or 5, wherein, for the fourth transmission hypothesis: determining the preferred reception beam is based on maximizing signal-to-interference-plus-noise ratio (SINR) associated with the one or more CSI-RS measurements; a signal power is determined based on the first signal power CSI-RS measurement for the first CSI-RS resource; an interference power is determined based on the interference measurements for the second CSI-RS resource; and the SINR is based on the signal power and the interference power.

Embodiment 7: The method of any of Embodiments 4 through 6, wherein, for the fifth transmission hypothesis: determining the preferred reception beam is based on maximizing signal-to-interference-plus-noise ratio (SINR) associated with the one or more CSI-RS measurements; a signal power is determined based on the first signal power CSI-RS measurement for the second CSI-RS resource; an interference power is determined based on the interference measurements for the first CSI-RS resource; and the SINR is based on the signal power and the interference power.

Embodiment 8: The method of any of Embodiments 1 through 7, wherein the one or more transmission hypotheses comprise one or more of: for a first transmission hypothesis, receiving signals from the first DL DMRS-port-group while signals from the second DL DMRS-port-group are refrained; for a second transmission hypothesis, receiving signals from the second DL DMRS-port-group while signals from the first DL DMRS-port-group are refrained; for a third transmission hypothesis, receiving signals from both the first DL DMRS-port-group and the second DL DMRS-port-group without interference; for a fourth transmission hypothesis, receiving signals from the first DL DMRS-port-group while receiving interfering signals from the second DL DMRS-port-group; or for a fifth transmission hypothesis, receiving signals from the second DL DMRS-port-group while receiving interfering signals from the first DL DMRS-port-group.

Embodiment 9: The method of any of Embodiments 1, 2, 4, 5, 6, 7, or 8, wherein the CSI-RS resource configuration comprises a single set of CSI-RS resources; the QCL information provides an indication of the one or more transmission hypotheses associated with the CSI-RS resource configuration; and determining at least one transmission hypothesis of the one or more transmission hypotheses is based on the indication of the one or more transmission hypotheses associated with the CSI-RS resource configuration in the QCL information.

Embodiment 10: The method of any of Embodiments 1, 3, 4, 5, 6, 7, or 8, wherein the CSI-RS resource configuration comprises a plurality of sets of CSI-RS resources; the QCL information provides an indication of the one or more transmission hypotheses associated with the CSI-RS resource configuration; and determining at least one transmission hypothesis of the one or more transmission hypotheses is based on the indication of the one or more transmission hypotheses associated with the CSI-RS resource configuration in the QCL information.

Embodiment 11: The method of any of Embodiments 1, 3, 4, 5, 6, 7, or 8, the CSI-RS resource configuration comprises a plurality of sets of CSI-RS resources; and the QCL information provides an indication of at least one of the CSI-RS resource set ID identified from the CSI-RS configuration, and does not provide an explicit indication of the one or more transmission hypotheses associated with the CSI-RS resource configuration; and determining at least one transmission hypothesis of the one or more transmission hypotheses is based on the indication of at least one of the CSI-RS resource set ID identified from the CSI-RS configuration in the QCL information.

Embodiment 12: The method of any of Embodiments 1, 3, 4, 5, 6, 7, or 8, the CSI-RS resource configuration comprises a plurality of sets of CSI-RS resources and the QCL information does not provide an indication of any CSI-RS resource set ID identified from the CSI-RS configuration, and does not provide an indication of the one or more transmission hypotheses associated with the CSI-RS resource configuration.

Embodiment 13: The method of any of Embodiments 1 through 12, wherein determining at least one transmission hypothesis of the one or more transmission hypotheses is based on the DMRS-port-group indication for DL transmission in the control signaling.

Embodiment 14: The method of Embodiment 13, wherein the determined at least one transmission hypothesis of the one or more transmission hypotheses comprises at least two transmission hypotheses, and further comprising determining the at least two transmission hypothesis based, at least in part, on the QCL information or other network configuration information.

Embodiment 15: A method of wireless communication by a base station (BS), comprising transmitting, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group; transmitting control signaling to the UE that indicates at least one transmission hypothesis of the one or more transmission hypotheses, wherein the control signaling includes at least one of a quasi-colocation (QCL) information indication associated with spatial reception parameters for DL reception or a DMRS-port-group indication for DL transmission; transmitting one or more CSI-RSs in accordance with the CSI-RS resource configuration; and receiving, from the UE, an indication of a preferred reception beam for one or more of the transmission hypotheses.

Embodiment 16: The method of Embodiment 15, wherein the CSI-RS resource configuration comprises a single set of CSI-RS resources, wherein the single set of CSI-RS resources comprises a first CSI-RS resource corresponding to the first DL DMRS-port-group and a second CSI-RS resource corresponding to the second DL DMRS-port-group.

Embodiment 17: The method of Embodiment 15, wherein the CSI-RS resource configuration comprises a plurality of sets of CSI-RS resources; the CSI-RS configuration further indicates that each set of CSI-RS resources in the plurality of sets of CSI-RS resources corresponds with a different transmission hypothesis of the one or more transmission hypotheses; and each set of the CSI-RS resources comprises at least one of a first CSI-RS resource corresponding to the first DL DMRS-port-group and a second CSI-RS resource corresponding to the second DL DMRS-port-group.

Embodiment 18: The method of any of Embodiments 15 through 17, wherein the one or more transmission hypotheses comprise one or more of: for a first transmission hypothesis, the UE receiving signals from the first DL DMRS-port-group while signals from the second DL DMRS-port-group are refrained; for a second transmission hypothesis, the UE receiving signals from the second DL DMRS-port-group while signals from the first DL DMRS-port-group are refrained; for a third transmission hypothesis, the UE receiving signals from both the first DL DMRS-port-group and the second DL DMRS-port-group without interference; for a fourth transmission hypothesis, the UE receiving signals from the first DL DMRS-port-group while receiving interfering signals from the second DL DMRS-port-group; or for a fifth transmission hypothesis, the UE receiving signals from the second DL DMRS-port-group while receiving interfering signals from the first DL DMRS-port-group.

Embodiment 19: The method of any of Embodiments 15, 16, or 18, wherein the CSI-RS resource configuration comprises a single set of CSI-RS resources and the QCL information provides an indication of the one or more transmission hypotheses associated with the CSI-RS resource configuration.

Embodiment 20: The method of any of Embodiments 15, 17, or 18, wherein the CSI-RS resource configuration comprises a plurality of sets of CSI-RS resources and the QCL information provides an indication of the one or more transmission hypotheses associated with the CSI-RS resource configuration.

Embodiment 21: The method of any of Embodiments 15, 17, or 18, wherein the CSI-RS resource configuration comprises a plurality of sets of CSI-RS resources and the QCL information provides an indication of at least one of the CSI-RS resource set ID identified from the CSI-RS configuration, and does not provide an explicit indication of the one or more transmission hypotheses associated with the CSI-RS resource configuration.

Embodiment 22: The method of any of Embodiments 15, 17, or 18, wherein the CSI-RS resource configuration comprises a plurality of sets of CSI-RS resources and the QCL information does not provide an indication of any CSI-RS resource set ID identified from the CSI-RS configuration, and does not provide an indication of the one or more transmission hypotheses associated with the CSI-RS resource configuration.

Embodiment 23: The method of any of Embodiments 1 through 22, wherein indicating at least one transmission hypothesis of the one or more transmission hypotheses is based on the DMRS-port-group indication for DL transmission in the control signaling.

Embodiment 24: The method of Embodiment 23, wherein the at least one transmission hypothesis of the one or more transmission hypotheses based on the DMRS-port-group indication comprises at least two transmission hypotheses, and further indicating the at least one transmission hypothesis based, at least in part, on the QCL information or other network configuration information.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   receiving a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group;
   performing one or more CSI-RS measurements for the one or more transmission hypotheses based, at least in part on the CSI-RS resource configuration;
   determining, for each of the one or more transmission hypotheses, a preferred reception beam for communicating with the at least one BS based, at least in part, on the one or more CSI-RS measurements;
   determining at least one transmission hypothesis of the one or more transmission hypotheses based on a DMRS-port-group indication for DL transmission included in control signaling received from the at least one BS, wherein:
      the control signaling further includes a quasi-colocation (QCL) information indication; and
      the determined at least one transmission hypothesis of the one or more transmission hypotheses comprises at least two transmission hypotheses determined based on the QCL information; and
   determining spatial reception parameters for DL reception based, at least in part, on the determined preferred reception beam associated with the determined at least one hypothesis of the one or more transmission hypotheses.

2. The method of claim 1, wherein:
   the CSI-RS resource configuration comprises a single set of CSI-RS resources; and
   the single set of CSI-RS resources comprises a first CSI-RS resource corresponding to the first DL DMRS-port-group and a second CSI-RS resource corresponding to the second DL DMRS-port-group.

3. The method of claim 1, wherein:
   the CSI-RS resource configuration comprises a plurality of sets of CSI-RS resources;
   the CSI-RS resource configuration further indicates that each set of CSI-RS resources in the plurality of sets of CSI-RS resources corresponds with a different transmission hypothesis of the one or more transmission hypotheses; and
   each set of the CSI-RS resources comprises at least one of a first CSI-RS resource corresponding to the first DL DMRS-port-group and a second CSI-RS resource corresponding to the second DL DMRS-port-group.

4. The method of claim 1, wherein performing one or more CSI-RS measurements for the one or more transmission hypotheses comprises a least one of:
for a first transmission hypothesis of the one or more transmission hypotheses, performing the one or more CSI-RS measurements comprises performing a first signal power CSI-RS measurement for a first CSI-RS resource corresponding to the first DL DMRS-port-group and not performing a second CSI-RS measurement for a second CSI-RS resource corresponding to the second DL DMRS-port-group;
for a second transmission hypothesis of the one or more transmission hypotheses, performing the one or more CSI-RS measurements comprises performing a first signal power CSI-RS measurement for a second CSI-RS resource corresponding to the second DL DMRS-port-group and not performing a second CSI-RS measurement for a first CSI-RS resource corresponding to the first DL DMRS-port-group;
for a third transmission hypothesis of the one or more transmission hypotheses, performing the one or more CSI-RS measurements comprises performing a first signal power CSI-RS measurement for a first CSI-RS resource corresponding to the first DL DMRS-port-group and performing a second signal power CSI-RS measurement for a second CSI-RS resource corresponding to the second DL DMRS-port-group;
for a fourth transmission hypothesis of the one or more transmission hypotheses, performing the one or more CSI-RS measurements comprises performing a first signal power CSI-RS measurement for a first CSI-RS resource corresponding to the first DL DMRS-port-group and performing interference measurements for a second CSI-RS resource corresponding to the second DL DMRS-port-group; or
for a fifth transmission hypothesis of the one or more transmission hypotheses, performing the one or more CSI-RS measurements comprises performing a first signal power CSI-RS measurement for a second CSI-RS resource corresponding to the second DL DMRS-port-group and performing interference measurements for a first CSI-RS resource corresponding to the first DL DMRS-port-group.

5. The method of claim 4, wherein:
for the first transmission hypothesis, the second transmission hypothesis, and the third transmission hypothesis, determining the preferred reception beam is based on maximizing reception quality associated with the signal power CSI-RS measurements.

6. The method of claim 4, wherein, for the fourth transmission hypothesis:
determining the preferred reception beam is based on maximizing signal-to-interference-plus-noise ratio (SINR) associated with the one or more CSI-RS measurements;
a signal power is determined based on the first signal power CSI-RS measurement for the first CSI-RS resource;
an interference power is determined based on the interference measurements for the second CSI-RS resource; and
the SINR is based on the signal power and the interference power.

7. The method of claim 4, wherein, for the fifth transmission hypothesis:
determining the preferred reception beam is based on maximizing signal-to-interference-plus-noise ratio (SINR) associated with the one or more CSI-RS measurements;
a signal power is determined based on the first signal power CSI-RS measurement for the second CSI-RS resource;
an interference power is determined based on the interference measurements for the first CSI-RS resource; and
the SINR is based on the signal power and the interference power.

8. The method of claim 1, wherein the one or more transmission hypotheses comprise one or more of:
for a first transmission hypothesis, receiving signals from the first DL DMRS-port-group while signals from the second DL DMRS-port-group are refrained;
for a second transmission hypothesis, receiving signals from the second DL DMRS-port-group while signals from the first DL DMRS-port-group are refrained;
for a third transmission hypothesis, receiving signals from both the first DL DMRS-port-group and the second DL DMRS-port-group without interference;
for a fourth transmission hypothesis, receiving signals from the first DL DMRS-port-group while receiving interfering signals from the second DL DMRS-port-group; or
for a fifth transmission hypothesis, receiving signals from the second DL DMRS-port-group while receiving interfering signals from the first DL DMRS-port-group.

9. The method of claim 1, wherein:
the CSI-RS resource configuration comprises a single set of CSI-RS resources;
the QCL information provides an indication of the one or more transmission hypotheses associated with the CSI-RS resource configuration; and
determining at least one transmission hypothesis of the one or more transmission hypotheses is based on the indication of the one or more transmission hypotheses associated with the CSI-RS resource configuration in the QCL information.

10. The method of claim 1, wherein:
the CSI-RS resource configuration comprises a plurality of sets of CSI-RS resources;
the QCL information provides an indication of the one or more transmission hypotheses associated with the CSI-RS resource configuration; and
determining at least one transmission hypothesis of the one or more transmission hypotheses is based on the indication of the one or more transmission hypotheses associated with the CSI-RS resource configuration in the QCL information.

11. The method of claim 1, wherein:
the CSI-RS resource configuration comprises a plurality of sets of CSI-RS resources;
the QCL information provides an indication of at least one CSI-RS resource set ID identified by the CSI-RS resource configuration, and does not provide an explicit indication of the one or more transmission hypotheses associated with the CSI-RS resource configuration; and
determining at least one transmission hypothesis of the one or more transmission hypotheses is based on the indication of the at least one CSI-RS resource set ID.

12. The method of claim 1, wherein:
the CSI-RS resource configuration comprises a plurality of sets of CSI-RS resources; and the QCL information does not provide an indication of any CSI-RS resource set ID identified from the CSI-RS resource configuration, and does not provide an indication of the one or more transmission hypotheses associated with the CSI-RS resource configuration.

13. A method of wireless communication by a base station (BS), comprising:
transmitting, to a user equipment (UE), a channel state information reference signal (CSI-RS) resource configuration for one or more transmission hypotheses, wherein the CSI-RS resource configuration includes CSI-RS resources corresponding to at least a first downlink (DL) demodulation reference signal (DMRS)-port-group and a second DL DMRS-port-group;
transmitting control signaling to the UE that indicates at least one transmission hypothesis of the one or more transmission hypotheses based on a DMRS-port-group indication for DL transmission included in the control signaling, wherein:
the control signaling further includes a quasi-colocation (QCL) information indication associated with spatial reception parameters for DL reception; and
the at least one transmission hypothesis of the one or more transmission hypotheses comprises at least two transmission hypotheses indicated based on the QCL information;
transmitting one or more CSI-RSs in accordance with the CSI-RS resource configuration; and
receiving, from the UE, an indication of a preferred reception beam for one or more of the transmission hypotheses.

14. The method of claim 13, wherein:
the CSI-RS resource configuration comprises a single set of CSI-RS resources; and
the single set of CSI-RS resources comprises a first CSI-RS resource corresponding to the first DL DMRS-port-group and a second CSI-RS resource corresponding to the second DL DMRS-port-group.

15. The method of claim 13, wherein:
the CSI-RS resource configuration comprises a plurality of sets of CSI-RS resources;
the CSI-RS resource configuration further indicates that each set of CSI-RS resources in the plurality of sets of CSI-RS resources corresponds with a different transmission hypothesis of the one or more transmission hypotheses; and
each set of the CSI-RS resources comprises at least one of a first CSI-RS resource corresponding to the first DL DMRS-port-group and a second CSI-RS resource corresponding to the second DL DMRS-port-group.

16. The method of claim 13, wherein the one or more transmission hypotheses comprise one or more of:
for a first transmission hypothesis, the UE receiving signals from the first DL DMRS-port-group while signals from the second DL DMRS-port-group are refrained;
for a second transmission hypothesis, the UE receiving signals from the second DL DMRS-port-group while signals from the first DL DMRS-port-group are refrained;
for a third transmission hypothesis, the UE receiving signals from both the first DL DMRS-port-group and the second DL DMRS-port-group without interference;
for a fourth transmission hypothesis, the UE receiving signals from the first DL DMRS-port-group while receiving interfering signals from the second DL DMRS-port-group; or
for a fifth transmission hypothesis, the UE receiving signals from the second DL DMRS-port-group while receiving interfering signals from the first DL DMRS-port-group.

17. The method of claim 13, wherein:
the CSI-RS resource configuration comprises a single set of CSI-RS resources; and
the QCL information provides an indication of the one or more transmission hypotheses associated with the CSI-RS resource configuration.

18. The method of claim 13, wherein:
the CSI-RS resource configuration comprises a plurality of sets of CSI-RS resources; and
the QCL information provides an indication of the one or more transmission hypotheses associated with the CSI-RS resource configuration.

19. The method of claim 13, wherein:
the CSI-RS resource configuration comprises a plurality of sets of CSI-RS resources; and
the QCL information provides an indication of at least one CSI-RS resource set ID identified by the CSI-RS resource configuration, and does not provide an explicit indication of the one or more transmission hypotheses associated with the CSI-RS resource configuration.

20. The method of claim 13, wherein:
the CSI-RS resource configuration comprises a plurality of sets of CSI-RS resources; and
the QCL information does not provide an indication of any CSI-RS resource set ID identified from the CSI-RS resource configuration, and does not provide an indication of the one or more transmission hypotheses associated with the CSI-RS resource configuration.

21. An apparatus for wireless communication by a user equipment (UE), comprising:
one or more processors configured to execute instructions stored on one or more memories and to cause the UE to:
receive a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group;
perform one or more CSI-RS measurements for the one or more transmission hypotheses based, at least in part on the CSI-RS resource configuration;
determine, for each of the one or more transmission hypotheses, a preferred reception beam for communicating with the at least one BS based, at least in part, on the one or more CSI-RS measurements; and
determine at least one transmission hypothesis of the one or more transmission hypotheses based on a DMRS-port-group indication for DL transmission included in control signaling received from the at least one BS, wherein:
the control signaling further includes a quasi-colocation (QCL) information indication; and
the determined at least one transmission hypothesis of the one or more transmission hypotheses comprises at least two transmission hypotheses determined based on the QCL information; and determine spatial reception parameters for DL reception based, at least in part, on the determined preferred reception beam associated with the determined at least one hypothesis of the one or more transmission hypotheses.

22. The apparatus of claim 21, wherein:
the CSI-RS resource configuration comprises a single set of CSI-RS resources; and
the single set of CSI-RS resources comprises a first CSI-RS resource corresponding to the first DL DMRS-port-group and a second CSI-RS resource corresponding to the second DL DMRS-port-group.

23. The apparatus of claim 21, wherein:
the CSI-RS resource configuration comprises a plurality of sets of CSI-RS resources; the CSI-RS resource configuration further indicates that each set of CSI-RS resources in the plurality of sets of CSI-RS resources corresponds with a different transmission hypothesis of the one or more transmission hypotheses; and
each set of the CSI-RS resources comprises at least one of a first CSI-RS resource corresponding to the first DL DMRS-port-group and a second CSI-RS resource corresponding to the second DL DMRS-port-group.

24. An apparatus for wireless communication by a base station (BS), comprising:
one or more processors configured to execute instructions stored on one or more memories and to cause the BS to:
transmit a channel state information reference signal (CSI-RS) resource configuration from at least one base station (BS) for one or more transmission hypotheses, wherein the CSI-RS resource configuration includes CSI-RS resources corresponding to at least a first downlink (DL) demodulation reference signal (DMRS)-port-group and a second DL DMRS-port-group;
transmit control signaling to a user equipment (UE) that indicates at least one transmission hypothesis of the one or more transmission hypotheses based on a DMRS-port-group indication for DL transmission included in the control signaling, wherein:
the control signaling further includes a quasi-colocation (QCL) information indication associated with spatial reception parameters for DL reception; and
the at least one transmission hypothesis of the one or more transmission hypotheses comprises at least two transmission hypotheses indicated based on the QCL information;
transmit one or more CSI-RSs in accordance with the CSI-RS resource configuration; and
receive, from the UE, an indication of a preferred reception beam for one or more of the transmission hypotheses.

25. The apparatus of claim 24, wherein:
the CSI-RS resource configuration comprises a single set of CSI-RS resources; and
the single set of CSI-RS resources comprises a first CSI-RS resource corresponding to the first DL DMRS-port-group and a second CSI-RS resource corresponding to the second DL DMRS-port-group.

26. The apparatus of claim 24, wherein:
the CSI-RS resource configuration comprises a plurality of sets of CSI-RS resources; the CSI-RS resource configuration further indicates that each set of CSI-RS resources in the plurality of sets of CSI-RS resources corresponds with a different transmission hypothesis of the one or more transmission hypotheses; and
each set of the CSI-RS resources comprises at least one of a first CSI-RS resource corresponding to the first DL DMRS-port-group and a second CSI-RS resource corresponding to the second DL DMRS-port-group.

\* \* \* \* \*